(12) United States Patent
Guo et al.

(10) Patent No.: US 8,452,011 B2
(45) Date of Patent: May 28, 2013

(54) METHOD AND APPARATUS FOR BILLING AND SECURITY ARCHITECTURE FOR VENUE-CAST SERVICES

(75) Inventors: Jiming Guo, Beijing (CN); Mingxi Fan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 12/569,705

(22) Filed: Sep. 29, 2009

(65) Prior Publication Data

US 2010/0104103 A1    Apr. 29, 2010

Related U.S. Application Data

(60) Provisional application No. 61/108,363, filed on Oct. 24, 2008.

(51) Int. Cl.
*H04N 7/167* (2006.01)

(52) U.S. Cl.
USPC .......................... 380/241; 380/277; 725/105

(58) Field of Classification Search
None
See application file for complete search history.

(56) References Cited

U.S. PATENT DOCUMENTS

| | | | | |
|---|---|---|---|---|
| 2004/0139024 | A1* | 7/2004 | So ................................ | 705/51 |
| 2006/0291662 | A1* | 12/2006 | Takahashi et al. ............ | 380/278 |
| 2007/0030972 | A1* | 2/2007 | Glick et al. .................. | 380/258 |
| 2007/0116282 | A1* | 5/2007 | Hawkes et al. ............... | 380/239 |
| 2007/0124785 | A1* | 5/2007 | Marsico ........................ | 725/105 |

FOREIGN PATENT DOCUMENTS

| | | |
|---|---|---|
| JP | 2006340296 A | 12/2006 |
| WO | WO2006109955 | 10/2006 |
| WO | WO2007027895 A2 | 3/2007 |
| WO | 2007075633 A2 | 7/2007 |
| WO | 2008109568 A1 | 9/2008 |

OTHER PUBLICATIONS

3GPP2: "Broadcast-Multicast Service Security Framework—3GPP2 S.S0083-A-Version 1.0," August 26, 2004, XP002575864, Sections 4.3, 4.4.
International Search Report and Written Opinion—PCT/US2009/061690, International Search Authority—European Patent Office, Apr. 15, 2010.

(Continued)

*Primary Examiner* — Gilberto Barron, Jr.
*Assistant Examiner* — Malcom Cribbs
(74) *Attorney, Agent, or Firm* — Won Tae Kim

(57) ABSTRACT

A security system is applied to venue-cast content transmissions over a broadcast/multicast network infrastructure. The broadcast network infrastructure may be Evolution-Data Only Broadcast Multicast Services (BCMCS) that facilitates distribution of a subscription-based content delivery service. A venue-cast service can be part of the subscription-based content delivery service and has an associated service key. Upon subscribing to the content delivery service, the subscriber access terminal is given the service key. Such service key may be associated with a particular subscriber package and/or venue location. The same service key is provided to the broadcast network infrastructure that broadcasts venue-cast content. A broadcast access key is generated by the broadcast network infrastructure and used to encrypt venue-specific content to be broadcasted. Consequently, only access terminals that have received the service key (e.g., subscribe to the associated subscription package and/or are located at a specific venue or location) can decrypt the broadcasted content.

34 Claims, 12 Drawing Sheets

OTHER PUBLICATIONS

Jeng-Feng Weng et al: "Comparative Study of Broadcast and Multicast in 3GPP and 3GPP2 Networks," Computer Communications Elsevier Science B.V. Netherlands, vol. 31, No. 17, Nov. 20, 2008, pp. 4220-4229, XP002575865, ISSN: 0140-3664, Section 3.

OMA: "Mobile Broadcast Services Architecture Candidate Version 1.0, Jun. 9, 2008, Open Mobile Alliance," Jun. 9, 2008, pp. 1-112, XP007910643, Section 5.3.4.

* cited by examiner

METHOD AND APPARATUS FOR BILLING AND SECURITY ARCHITECTURE FOR VENUE-CAST SERVICES

CLAIM OF PRIORITY UNDER 35 U.S.C. §119

The present application for patent claims priority to U.S. Provisional Application No. 61/108,363 entitled "Method and Apparatus for Billing and Security Architecture for Venue-Case Service Bundled with Terrestrial Mobile TV", filed Oct. 24, 2008, assigned to the assignee hereof and hereby expressly incorporated by reference herein.

BACKGROUND

1. Field

One feature relates to providing content protection for venue-specific or event-specific broadcast services. More specifically, a service subscriber key is distributed by a venue service provider to subscriber access terminals and is also provided to the broadcast multicast network infrastructure to encrypt the content to be broadcasted.

2. Background

Mobile broadcast is a technology that enables wireless delivery of content and services to consumers, among which some of its applications include mobile television (TV), mobile advertisement, and up-to-date media distribution via clip-cast and data-cast. There is potential value and convenience to providing broadcast services to enable venue-centric content delivery to mobile subscribers within, or in the vicinity of, a particular venue. Examples include sending an electronic coupon to shoppers' devices in a mall, streaming videos that introduce amenities on a cruise ship, and/or live broadcast from different corners of a race track to mobile users in a NASCAR stadium. This type of localized, event-based or venue-based broadcast service, hereinafter referred to as venue-cast, has the potential of becoming an attractive value-added service to current subscribers of wireless services. Venue-cast transmissions or broadcasts may be done via a number of physical layer technologies including cellular (e.g., Evolution Data-Only (EVDO)) as well as terrestrial mobile TV transmission (e.g. MediaFLO by Qualcomm Inc.).

One difficulty with such venue-cast broadcast services is how to bill or restrict the venue-cast services to particular users (e.g., paid or authorized subscribers or users) in an efficient and reliable way. Therefore, a method is needed to allow securing such venue-cast services and/or billing them to the subscriber or user.

SUMMARY

A security system is provided for transmission of venue-cast content over a broadcast/multicast network infrastructure. Such security system may allow broadcasts to be targeted to subscribing devices in a particular venue, location, or event. Generally, as part of a subscription-based content delivery system, a subscriber device selects a subscription package and obtains a venue service key. Such venue service key may be associated with the selected service package, venue/location/event, a user profile and/or a combination thereof. This venue service key is also provided to a content server that is part of a broadcast/multicast network infrastructure to generate a broadcast access key with which venue-specific content is encrypted. At the subscriber access terminal, the same broadcast access key can be independently generated based, at least in part, on the venue service key. Consequently, even though content is broadcasted or multicasted, only subscriber access terminal in the particular venue/location/even may be capable of decrypting the broadcasted content. This allows deployment of venue-specific content (such as coupons for stores in a mall, etc.) to a target set of subscriber access terminals that can be targeted based on the location, venue, event and/or selected subscription package.

An access terminal and a method operational therein are provided for receiving venue-specific broadcast content. A subscription process may be initiated by the access terminal with a subscription-based service. A venue service key and a flow identifier may be received from the subscription-based service. For instance, the venue service key and/or flow identifier may be specific to a particular subscription package for the subscription-based service. Additionally, at least one of the venue service key or flow identifier may be specific to a particular venue.

A broadcast access key is then generated by the access terminal based on at least the venue service key and a flow identifier. A broadcast of venue-specific content is then received by the access terminal, where the venue-specific content is encrypted by the broadcast access key. The received venue-specific content is then decrypted using the broadcast access key. The venue-specific content may be received from an Evolution Data-Only (EVDO) broadcast/multicast server (BCMCS).

According to another feature, the venue service key may be updated based on an epoch identifier that may be received by the access terminal. Consequently, the broadcast access key may be updated based on the updated service key.

A venue service gateway and a method operational therein are also provided for securely delivering venue-specific broadcast content to access terminals. A venue service key may be received by the venue service gateway from a subscription-based service, wherein the venue service key is associated with one of at least a subscription package or a venue. The venue service gateway may then update a broadcast multicast services server with the venue service key, wherein the broadcast multicast services server encrypts venue-specific content using a broadcast access key generated based on the venue service key.

According to one feature a new service epoch identifier may be received by the venue service gateway and used to update the venue service key. The broadcast multicast services server is then updated with the new service epoch identifier which is used to update the venue service key and, consequently, the broadcast access key. The venue service gateway may also send a flow identifier to the broadcast multicast services server which is also used to generate the broadcast access key. A venue identifier may also be sent to the broadcast multicast services server which is also used to generate the broadcast access key. The venue service gateway may also aggregate venue-specific content and forwards the aggregated venue-specific content to the broadcast multicast services server.

A broadcast multicast services server and a method operational therein are provided for facilitating secure delivery of venue-specific broadcast content to access terminals. A venue service key may be received by the broadcast multicast services server from a venue service gateway for a subscription-based service, wherein the venue service key is associated with one of at least a subscription package or a venue. The broadcast multicast services server may generate a broadcast access key based, at least in part, on the venue service key. Venue-specific content may then be encrypted based on the broadcast access key. The encrypted venue-specific content is then broadcasted.

An updated service key may also be received from the venue service gateway and is used by the broadcast multicast services server to update the broadcast access key. According to one feature, an epoch identifier is received from the venue service gateway. The venue service key is updated using the epoch identifier. Consequently, the broadcast access key can then be updated using the updated service key. Additionally, a flow identifier may also be received from the venue service gateway and used to generate the broadcast access key using the flow identifier. Similarly, a venue identifier may be received from the venue service gateway and the broadcast access key may also be generated using the venue identifier. The broadcast multicast services server may aggregate the venue-specific content that is subsequently broadcasted.

DETAILED DESCRIPTION

Figure 1:
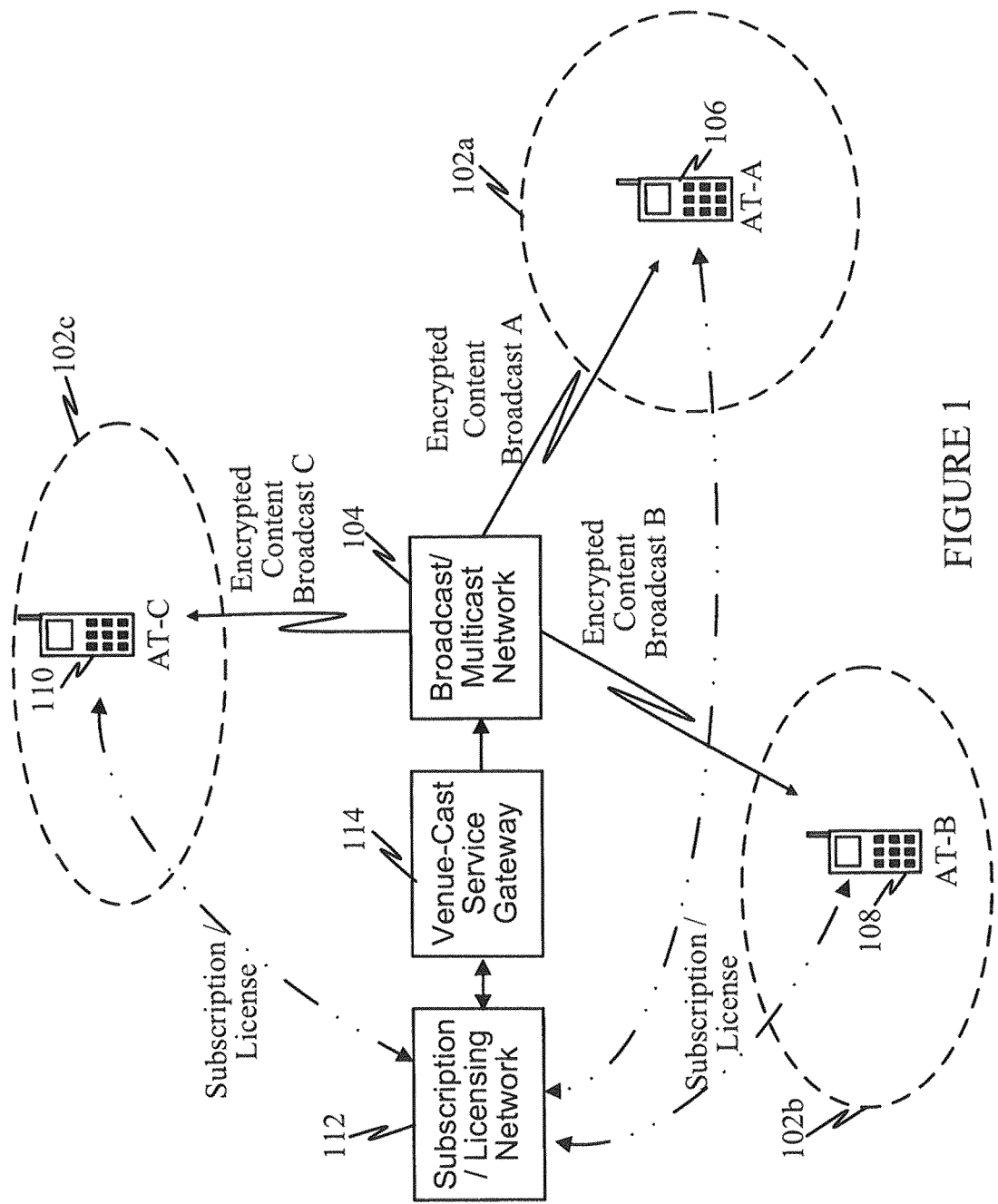
FIG. 1 is a block diagram illustrating a network environment in which venue-cast services may be deployed.

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Overview

A security system is applied to venue-cast content transmissions over a broadcast/multicast network infrastructure. The broadcast network infrastructure may be, for example, Evolution-Data Only Broadcast Multicast Services (BC-MCS) that facilitates distribution of a subscription-based content delivery service. A venue-cast service can be part of the subscription-based content delivery service and has an associated service key. Upon subscribing to the content delivery service, the subscriber access terminal is given the venue service key associated with the venue-cast service. Such service key may be associated with a particular subscriber package and/or venue location. The same service key is provided to the broadcast network infrastructure that broadcasts venue-cast content. A broadcast access key is generated by the broadcast network infrastructure and used to encrypt venue-specific content to be broadcasted. Consequently, only access terminals that have received the venue service key (e.g., access terminals subscribed to the associated subscription package and/or are located at a specific venue location) can generate the broadcast access key and decrypt the broadcasted venue-specific content.

Additionally, a random seed may be used to change the broadcast access key over time. In one example, the random seed may be embedded in venue-cast packets of the broadcasted venue-specific content. Given that the broadcast access key derivation method and random seed are known or provided to the subscriber access terminal, the access terminal is able to receive venue-cast service and successfully decrypt the content.

Network Environment

One example of a subscriber-based service is MediaFLO, by Qualcomm Inc., which broadcasts data to portable or mobile access terminals such as cellular phones, mobile phones, mobile communications, and/or personal digital assistants. Broadcast data may include multiple real-time audio and video streams, individual, non-realtime video and audio "clips", as well as IP Datacast application data such as stock market quotes, sports scores, and weather reports. The "F-L-O" in MediaFLO stands for Forward Link Only, meaning that the data transmission path is one-way, from the network content server to the access terminal. MediaFLO addresses the inherent spectral inefficiency of unicasting high-rate full-motion video/audio to multiple subscribers (access terminals) by instead broadcasting such content. To limit access to the broadcasted content to subscriber access terminals, the broadcasted content is secured or encrypted by a broadcast access key known to the subscriber access terminals, but not other (non-subscriber) access terminals. MediaFLO content delivery may be implemented, for example, over an EVDO network that authenticates subscriber access terminals and distributes keys used to decode or access content delivered through the network.

FIG. 1 is a block diagram illustrating a wireless network in which secured venue-cast services may be deployed. The venue-cast services may provide location-specific, venue-specific, and/or event-specific content via a broadcast/multicast network 104 to one or more access terminals 106, 108, and 110 in one or more locations, venues, and/or events 102a, 102b, 102c. In some implementations, the broadcast/multicast network 104 may include one or more servers, access points, content servers, etc., that are configured to facilitate wireless data transmissions (e.g., content, video, audio, multimedia, text, etc.) to the access terminals in a broadcasts and/or multicasts manner. That is, such content may be broadcasted on a particular channel so that a plurality of access terminals is able to concurrently obtain or receive the same content broadcast.

Initially, the access terminals 106, 108, and 110 may subscribe to a broadcast or multicast service (e.g., MediaFLO) via a subscription/licensing network 112. Different levels, types, and/or cost of content service may be provided using different service packages that can be selected by a user of a subscriber access terminal. As part of this process, depending on the service package to which an access terminal subscribes, a service license may be sent to each subscriber access terminal 106, 108, and 110, where such service license may include a service key. The each subscriber access terminal 106, 108, or 110, may also be provisioned (either beforehand or as part of the delivery of the service license) with a key generation algorithm or information that allows the subscriber access terminal 106, 108, or 110 to generate a broadcast access key at least partially based on the service key. Note that the subscription/licensing network 112 may communicate either directly with the subscriber access terminal 106, 108, and 110 (via its own channels) or via the broadcast/multicast network 104.

A venue-cast service gateway 114 may provide the service key from the subscription/licensing network 112 to the broadcast/multicast network 104. The broadcast/multicast network 104 may use the service key to generate the broadcast access key with which to encrypt venue-cast content to be broadcasted. Having received the service key, each subscriber access terminal 106, 108, and 110 is able to generate the broadcast access key (or equivalent) with which to decrypt the broadcasted content from the broadcast/multicast network 104.

In one example, the access terminals 106, 108, and 110 may receive the same service key if they subscribe to the same service package. Alternatively, each access terminal 106, 108, and 110 may a different key if they subscribe to a different service package. Additionally, in one implementation, the location of an access terminal may also be a factor in determining service key it receives. That is, the access terminal 106 in a first location 102*a* (e.g., a first venue or event) may receive a first service key, while an access terminal 108 in a second location 102*b* (e.g., a second venue or event) may receive a second service key. Consequently, global, terrestrial, or localized positioning information for a subscriber access terminal may be obtained during the subscription/licensing process for the purpose of determining which service key that particular access terminal should receive. For example, in a subscription/licensing request, an access terminal may provide its position, which the subscription/licensing network 112 may use to select the appropriate service key. In this manner, having received the service key and generated the broadcast access key, an access terminal is able to decode only those encrypted content broadcasts which are intended for a particular venue and/or subscribers of a particular service package.

A random or epoch seed may also be generated at the subscription/licensing network 112 and provided to the access terminals 106, 108, and 110 and venue-cast service gateway 114 so that the service key (and consequently the broadcast key) can be changed over time.

In some implementations, the subscription/licensing network 112 and broadcast/multicast network 104 may be implemented through distinct physical networks while in other implementations they may be implemented on the same physical network. The venue-cast service gateway 114 may operate as part of the subscription/licensing network 112, providing an interface through which the service key may be passed to the broadcast/multicast network 104.

Figure 2:
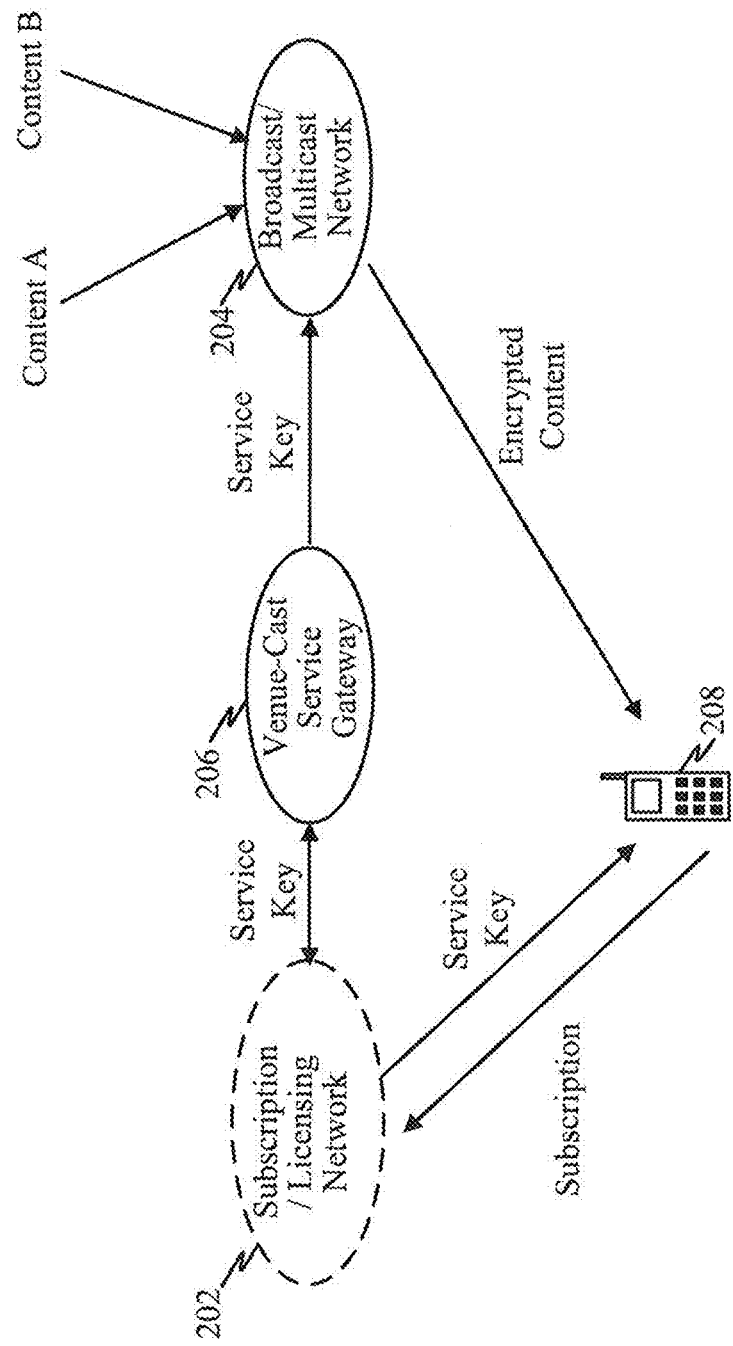
FIG. 2 is a block diagram illustrating a network architecture in which secure content broadcasts/multicasts may be implemented as part of a venue-cast system.

FIG. 2 is a block diagram illustrating an example of network architecture in which secure content broadcasts/multicasts may be implemented as part of a venue-cast system. A subscription/licensing network 202 may implement subscription and/or licensing for a subscription-based content delivery application, such as MediaFLO. That is, a wireless access terminal 208 may subscribe with the subscription-based content delivery application (through the subscription/licensing network 202) and, in response to such subscription, may receive a service license (which may include a service key) corresponding to a selected subscription package. The same service key may be provided to a venue-cast service gateway 206. In some implementations, the venue-cast service gateway 206 may be specifically associated and/or collocated at a particular venue which it serves. In other implementations, the venue-cast service gateway 206 may be centrally located and adapted to serve one or more remote venues. The venue-cast service gateway 206 may send the service key to the broadcast/multicast network 204. The broadcast/multicast network 204 may then generate a broadcast access key based on the service key. The broadcast/multicast network 204 may aggregate content (e.g., Content A and Content B) from one or more sources and uses the broadcast access key to encode or encrypt such content prior to broadcasting or multicasting. Consequently, only access terminals that have the same service key and are able to recreate the broadcast access key can decode or decrypt the broadcasted content. Note that in various implementations, the service key may be specific to a particular venue, may be specific to a particular type of service package to which the access terminal 208 subscribes, or may be independent and/or distinct from the service package to which the access terminal 208 subscribes.

In addition to receiving the service key, during a subscription stage, the access terminal 208 may also be provisioned with the necessary information to generate the same broadcast access key as that generated by the broadcast/multicast network 204. For instance, the access terminal 208 may obtain or receive an algorithm and/or other parameters used to generate the broadcast access key.

Figure 3:
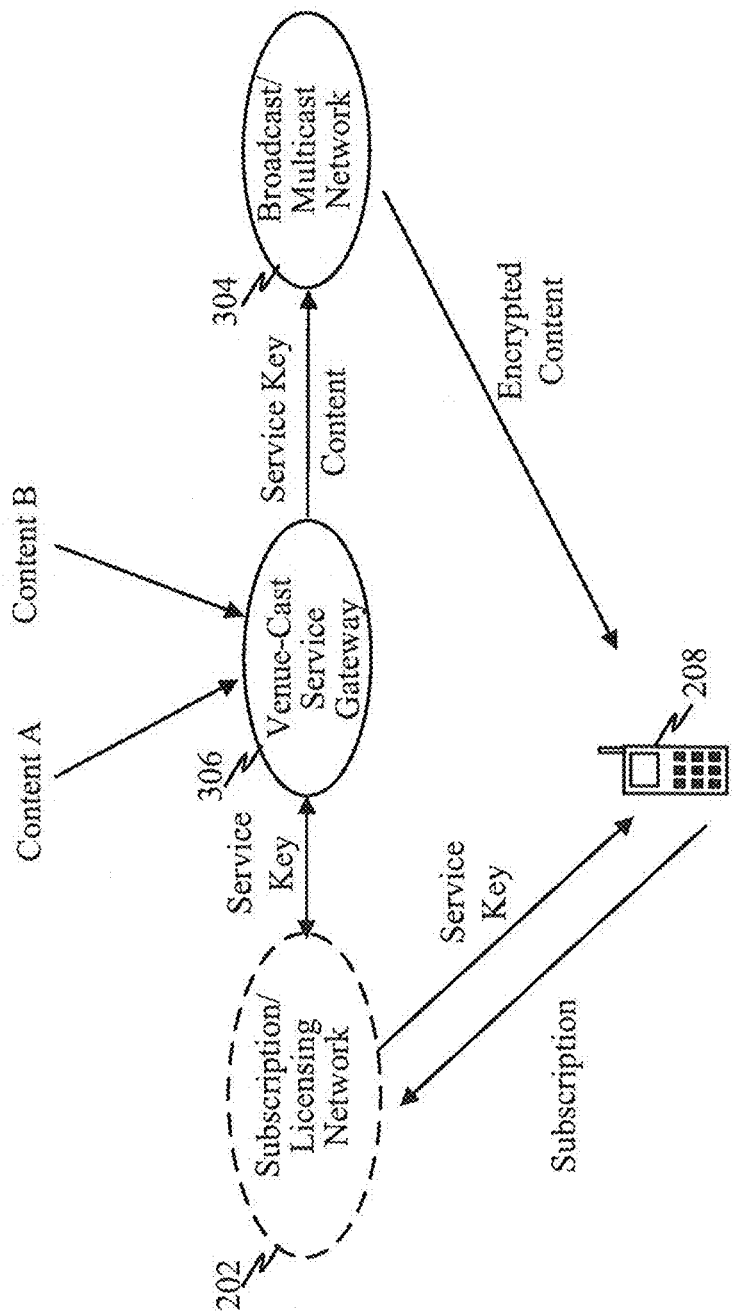
FIG. 3 is a block diagram illustrating another example of a network architecture in which secure content broadcasts/multicasts may be implemented as part of a venue-cast system.

FIG. 3 is a block diagram illustrating another example of a network architecture in which secure content broadcasts/multicasts may be implemented as part of a venue-cast system. The network architecture operates very similar to that described in FIG. 2. However, in this example, content is aggregated by a venue-cast service gateway 306 and provided to a broadcast/multicast network 304 for encoding or encryption using the broadcast access key and broadcasting/multicasting.

Note that, as used herein, the subscription/licensing network of FIGS. 1, 2, and/or 3 may refer to a distinct physical/logical network, a service, a server, and/or a combination thereof, that perform subscription and/or licensing for access terminals seeking subscription-based content delivery services. For example, the functions performed by the subscription/licensing network 112 or 202 may be performed by one or more servers, infrastructure devices, processors, computers, and/or nodes that are part of the subscription/licensing network 112 or 202.

Additionally, the broadcast/multicast network of FIGS. 1, 2, and/or 3 may refer to a distinct network, a service, a server, and/or a combination thereof, that broadcasts content for a subscription-based service. For example, the functions performed by the broadcast/multicast network 104, 204 or 304 may be performed by one or more servers, infrastructure devices, processors, computers, and/or nodes that are part of the broadcast/multicast network 104, 204 or 304.

Security Architecture

Figure 4:
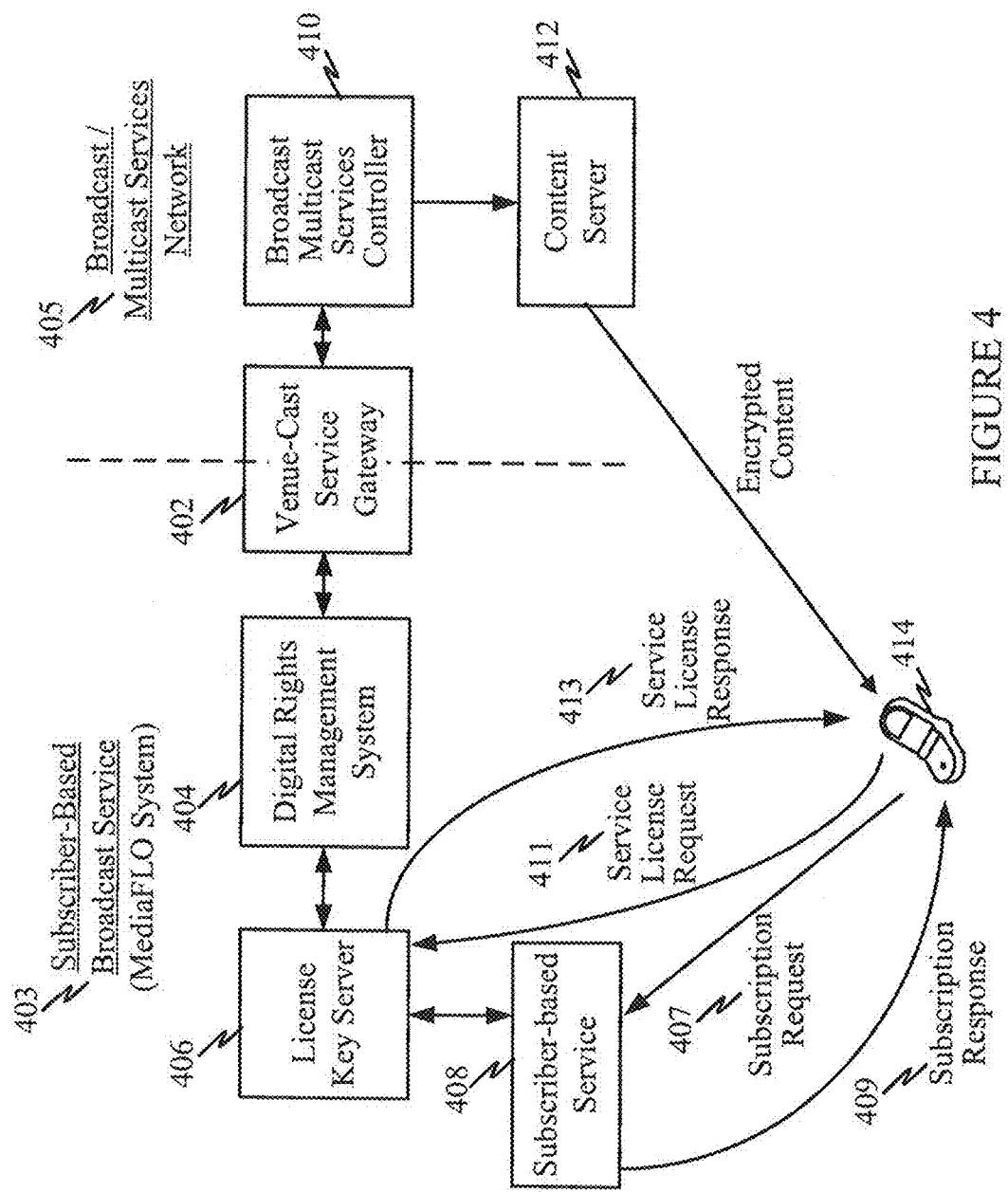
FIG. 4 is a block diagram illustrating a security architecture that may be implemented for a venue-cast system.

FIG. 4 is a block diagram illustrating a security architecture that may be implemented for a venue-cast system. In this example, a subscriber-based broadcast service (e.g., MediaFLO System) 403 may be implemented through Broadcast Multicast Services (BCMCS) Network 405 (e.g., an EVDO network).

During a subscription phase, an access terminal 414 may send a subscription request 407 to a Subscriber-Based Service (SBS) 408 and receives a subscription response 409 after it has been authenticated and authorized by the SBS 408. Additionally, the access terminal 414 may send a service license request 411 to a License Key Server (LKS) 406 which may communicate with a Digital Rights Management System (DRMS) 404 that then provides a service key to the access terminal 414. In one example, the service key may be generated, stored, and/or provided by the Digital Rights Management System 404. Such service key may be associated with a level of service (e.g., service package to which the access terminal subscribes) and/or a particular location, event, and/or venue. The service key may be included, in this example, as part of a service license response 413 sent by the license key server 406 to the access terminal 414.

A Venue-Cast Service Gateway 402 may also obtain the same service key from the Digital Rights Management System 404 and sends it to the Broadcast Multicast Services Network 405 (e.g., to the Broadcast Multicast Services Controller 410). The Broadcast Multicast Services Controller 410 may use the service key to generate a broadcast access key which may be used by a content server 412 to encrypt or encode content to be broadcasted or multicasted.

According to one example, security information (e.g., service key) from the subscriber-based broadcast service 403 may be shared with the Broadcast Multicast Services Controller 410 for content protection. After a service license has been successfully updated, the access terminal 414 receives the corresponding service key for the subscribed venue-cast services. For example, if subscription of venue services is based on MediaFLO subscription procedures, the security information may be shared between the MediaFLO System (Subscriber-based Broadcast Service 403) and an EVDO BCMCS Network 405 via a signaling interface between the Venue-Cast Service Gateway 402 and the BCMCS Controller 410 so that the BCMCS Network 405 can use the MediaFLO System service security information (e.g., service key and epoch identifier, etc.) for content protection (e.g., to generate a broadcast access key with which content is encrypted).

On example of MediaFLO and EVDO BCMCS related security information is listed in Table 1 which illustrates the functional phases Service Activation, Content Subscription and Content Delivery for both MediaFLO and EVDO BCMCS. In addition, the BCMCS Network includes an additional Flow Information Acquisition phase. For each phase, the different keys delivered or used are shown.

TABLE 1

| MediaFLO System | EVDO BCMCS Network | |
|---|---|---|
| Keys | Functional Phases | Keys |
| (Kencryption, Kdecryption), Kauthentication, Kmulticastauthentication | Service Activation | RK |
| Ksession Kservice | Content Subscription | |
| | BCMCS flow information acquisition | TK |
| Kworking(streaming/datacast) Kpresentation(clipcast) | Content Delivery | BAK, SK |

After the access terminal AT 414 has subscribed for venue services using the subscriber-based broadcast service 403, content encryption and decryption may follow EVDO BCMCS Network 405 procedures. In the EVDO BCMCS Network 405, content protection may be based on the use of a BCMCS Broadcast Access Key (BAK) associated with each BCMCS flow. Therefore, the BAK key may be derived based on the service key (e.g., Kservice for MediaFLO System or SK for BCMCS), a Broadcast Access Key identifier (BAK_ID) and a flow identifier (as one venue service may include multiple flows), to generate a (BAK, BAK_ID) pair for each BCMCS flow. The flow identifier may be used to distinguish between a plurality of different content broadcasts.

Example of Broadcast Access Key Generation

The 3rd Generation Partnership Project 2 (3GPP2), has specified a method for generating such Broadcast Access Key (BAK) in Enhanced Cryptographic Algorithms (3GPP2 S.S0055-A). In Section 2.2.2.6 of 3GPP2 S.S0055-A version 4 (January 2008), a 128-bit ciphering key (CK) generation procedure is described, where a function f3 is a pseudo random function used to generate a ciphering key (CK). In the specification, the ciphering key (CK) may be generated based on a Subscriber Authentication Key (K)—128 bits, a Type Identifier (f3)—8 bits, a Random Number (RAND)—128 bits, and a Family Key (Fmk)—32 bits.

However, according to one implementation for generating a broadcast access key, the service key may be used, instead of the Subscriber Authentication Key (K), to generate the ciphering key (i.e., broadcast access key). The ciphering key (CK) (i.e., broadcast access key) may then be used to encrypt or encode content for a subscriber-based broadcast service. The Type Identifier may be set to 0x45. The most significant 96 bits of the Random Number RAND may be set to the repetition of a BCMCS flowID (which identifies a particular flow of content from the BCMCS) based on flowID length and the least significant 32 bits of RAND may be set to the repetition of BAK_ID. The Family Key (Fmk) may be set to 0x41484147, which identifies Authentication and Key Agreement keys. In this manner, the ciphering key (CK) calculated in this manner can then be utilized as the broadcast access key (BAK) for encrypting content to be broadcasted by the BCMCS Content Server.

Figure 5:
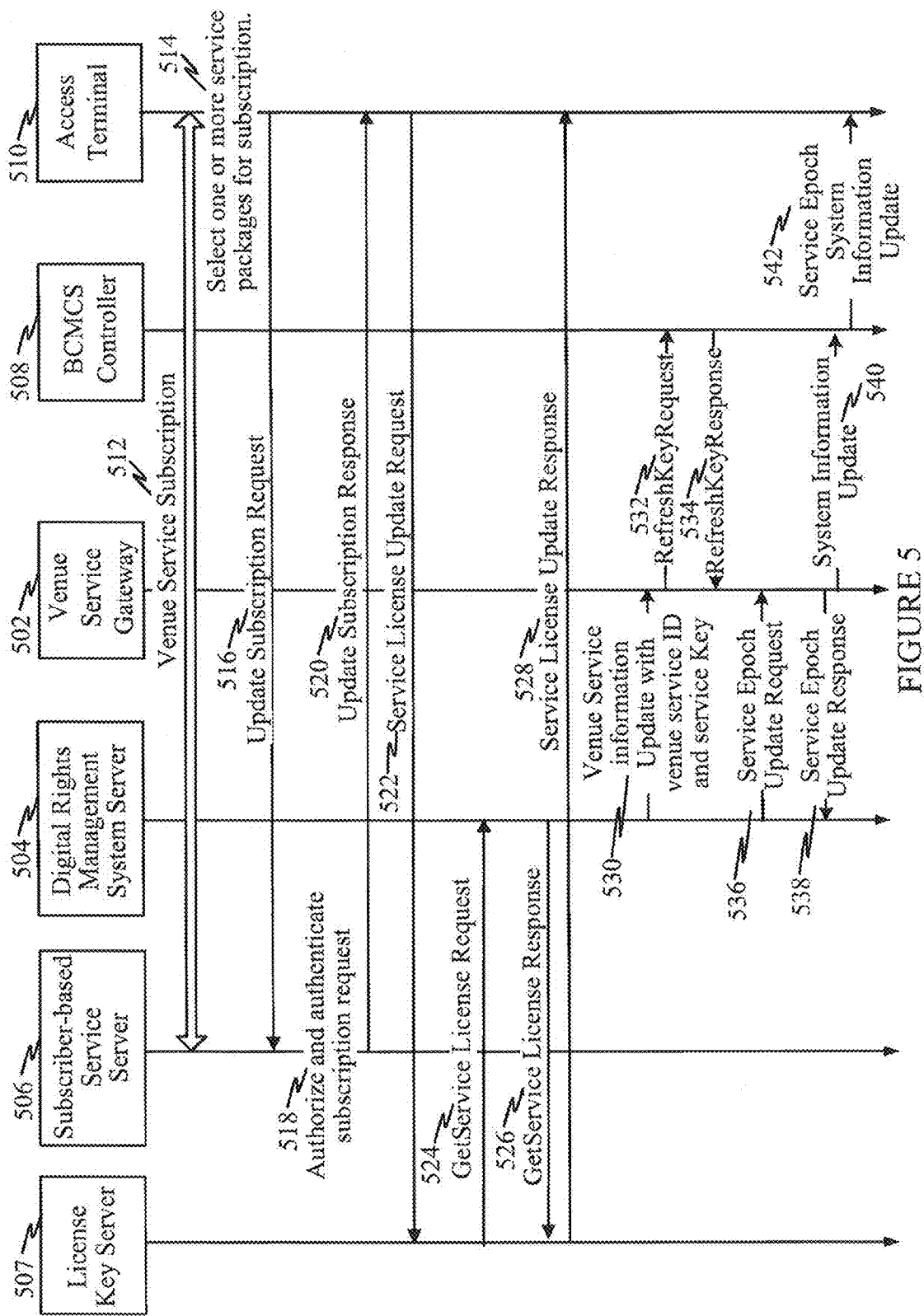
FIG. 5 is an example of a venue service subscription process in which a security key may be provided from a subscription-based content delivery service to selectively secure broadcasts/multicasts of content.

FIG. 5 is an example of a venue service subscription process 512 in which a security key may be used by a subscription-based content delivery service to selectively secure broadcasts/multicasts of content. One or more service packages are selected for subscription 514 by the access terminal 510. The access terminal 510 sends an Update Subscription Request 516 to the Subscriber-based Service Server 506. The Subscriber-based Service Server 506 authorizes and authenticates the Update Subscription Request 518. The Subscriber-based Service Server 506 sends an Update Subscription Response 520 to the access terminal 510 to indicate whether the subscription is successful. The access terminal 510 then sends a Service License Update Request 522 to the License Key Server 507 to request service licenses for the services in the selected service packages. The License Key Server 507 may request that the Subscriber-based Service Server 506 authorize the Service License Update Request 522 it receives from the access terminal 510. The License Key Server 507 may send a GetServiceLicense_Request 524 to a Digital Rights Management System Server 504 to request service license keys for the new services. The Digital Rights Management System Server 504 replies with a GetServiceLicense_Response 526 carrying the keys for the new services, including a service key. The License Key Server 507 replies with a Service License Update Response 528 to the access terminal 510 with the service license for the new services, including a service key.

During the venue service subscription phase or process 512, the Digital Rights Management System Server 504 pushes the venue service key information (including a venue service identifier and an associated service key) 530 to venue service gateway 502. The venue service gateway 502 updates the Broadcast/Multicast Services Controller 508 with the venue service identifier (ID) and its associated service key via a Refresh Key Request 532. The Broadcast/Multicast Services Controller 508 may reply with a Refresh Key Response 534. The venue service identifier may serve to identify the venue for which the service key is intended.

When the license update of venue service is performed, Digital Rights Management System Server 504 may notify a Venue Service Gateway 502 of new service epoch information (e.g., epoch seed) by sending a Service Epoch Update Request 536 and/or receiving a Service Epoch Update Response 538. The venue service gateway 502 updates the BCMCS Controller 508 using the latest system information 540 with a new service epoch ID. For instance, the new service epoch ID may be a value or identifier that serves to update the service key. The new service epoch ID is broadcasted or multicasted 542 to the access terminal 510 via the BCMCS Controller 508. The access terminal 510 may utilize the epoch ID and service key to generate a broadcast access key with which to decode subsequent content broadcasts.

Figure 6:
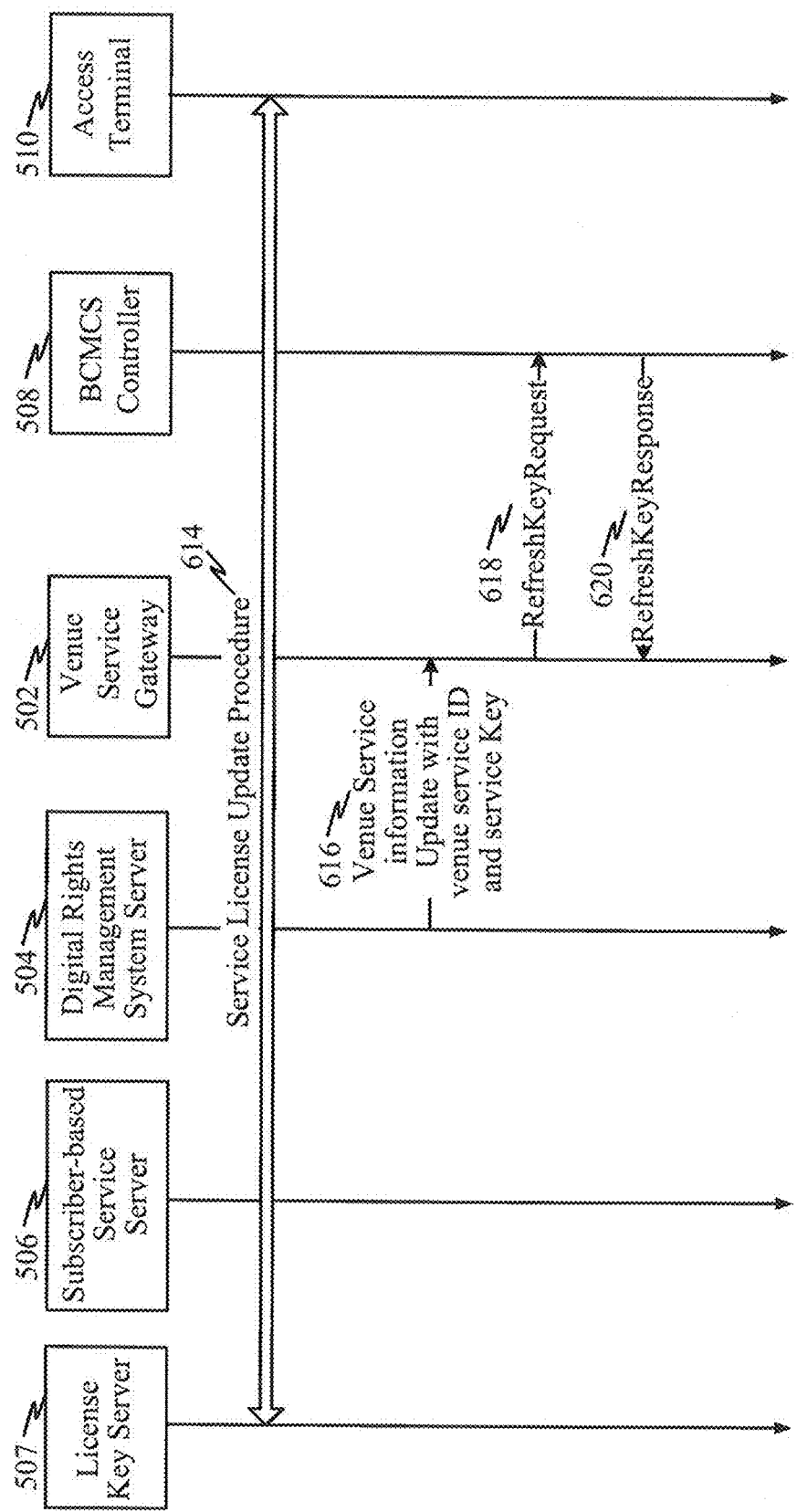
FIG. 6 is an example of a service license update procedure.

Upon detection of service epoch change, the access terminal 510 may initiate a service license update procedure as illustrated in FIG. 6.

FIG. 6 is an example of a service license update procedure. Upon receiving a service license update request, the Digital Rights Management System Server 504 again pushes the venue service key information 616 (e.g., service key and/or epoch identifier or seed) to the Venue Service Gateway 502. The Venue Service Gateway 502 again updates the BCMCS Controller 508 with the venue service identifier and its associated service key information via a request 618 and response 620.

Having provided the service key and/or epoch identifier or seed to the BCMCS Controller 508, the BCMCS Controller 508 can generate a broadcast access key (BAK) based on the service key and/or epoch identifier or seed. The broadcast access key can then be used to encrypt content to be broadcasted. Similarly, the access terminal 510 can generate the broadcast access key to decode or decrypt the broadcasted content.

Exemplary Access Terminal

Figure 7:
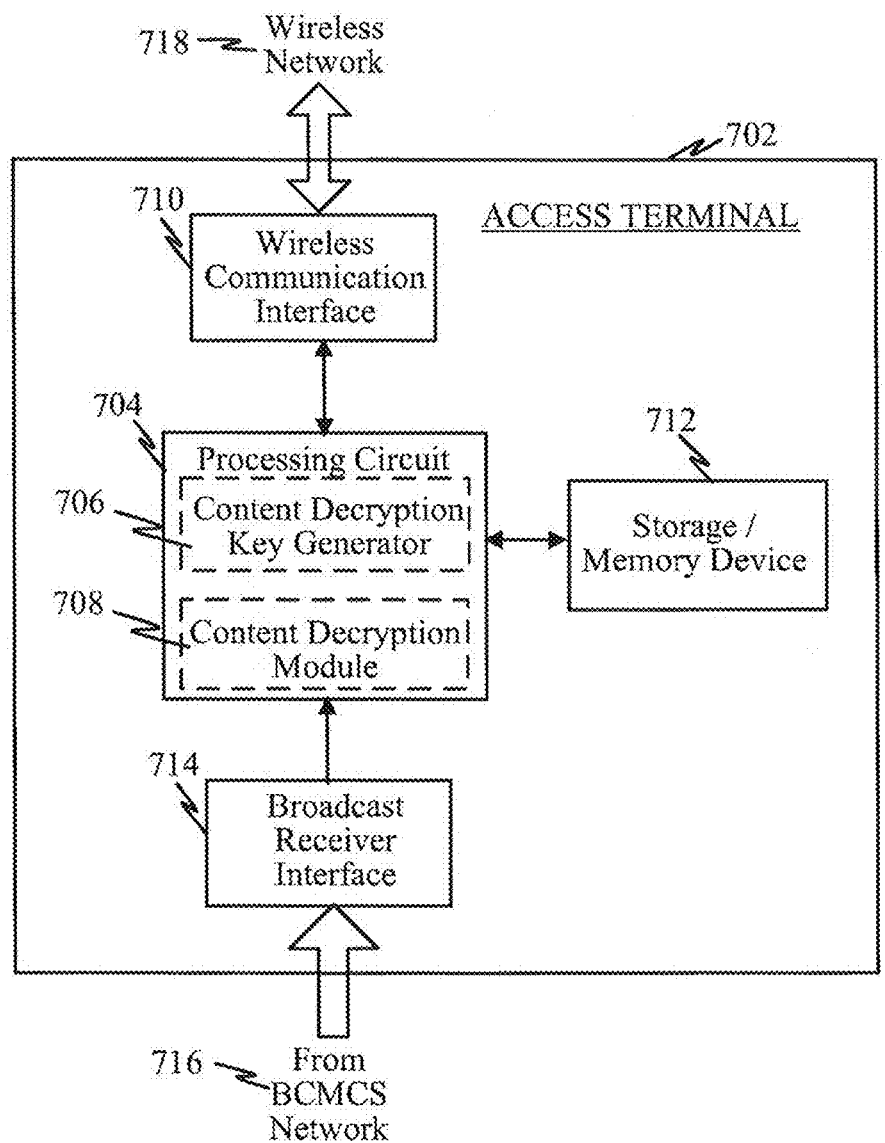
FIG. 7 is a block diagram illustrating an example of an access terminal.

FIG. 7 is a block diagram illustrating an example of an access terminal. The access terminal 702 may include a processing circuit 704 coupled to a wireless communication interface 710, a broadcast receiver interface 714, and/or a storage device 712. The processing circuit 704 may include a content decryption key generator 706 and a content decryption module 708. In various implementations, the wireless communication interface 710 and broadcast receiver interface 714 may be distinct communication interfaces or they may be the same communication interface and may operate on the same or different frequency channels.

The access terminal 702 may receive a venue service key as part of a subscription/licensing process via the wireless communication interface 710 over a wireless network 718. The venue service key may be associated with a particular type of subscription package and/or level of service selected by the user of the access terminal 702. The access terminal 702 may also be provisioned with other information for a BCMCS network 716. The content decryption key generator 706 utilizes the received venue service key to generate a broadcast access key (BAK). The content decryption module 708 may use the broadcast access key to decrypt broadcasted content received over the broadcast receiver interface 714 from the BCMCS network 716. Note that, the venue service key may be updated by an epoch identifier received by the access terminal 702. When the venue service key is updated, a new or updated broadcast access key (BAK) is generated by the content decryption key generator 706 based on the updated venue service key.

Figure 8:
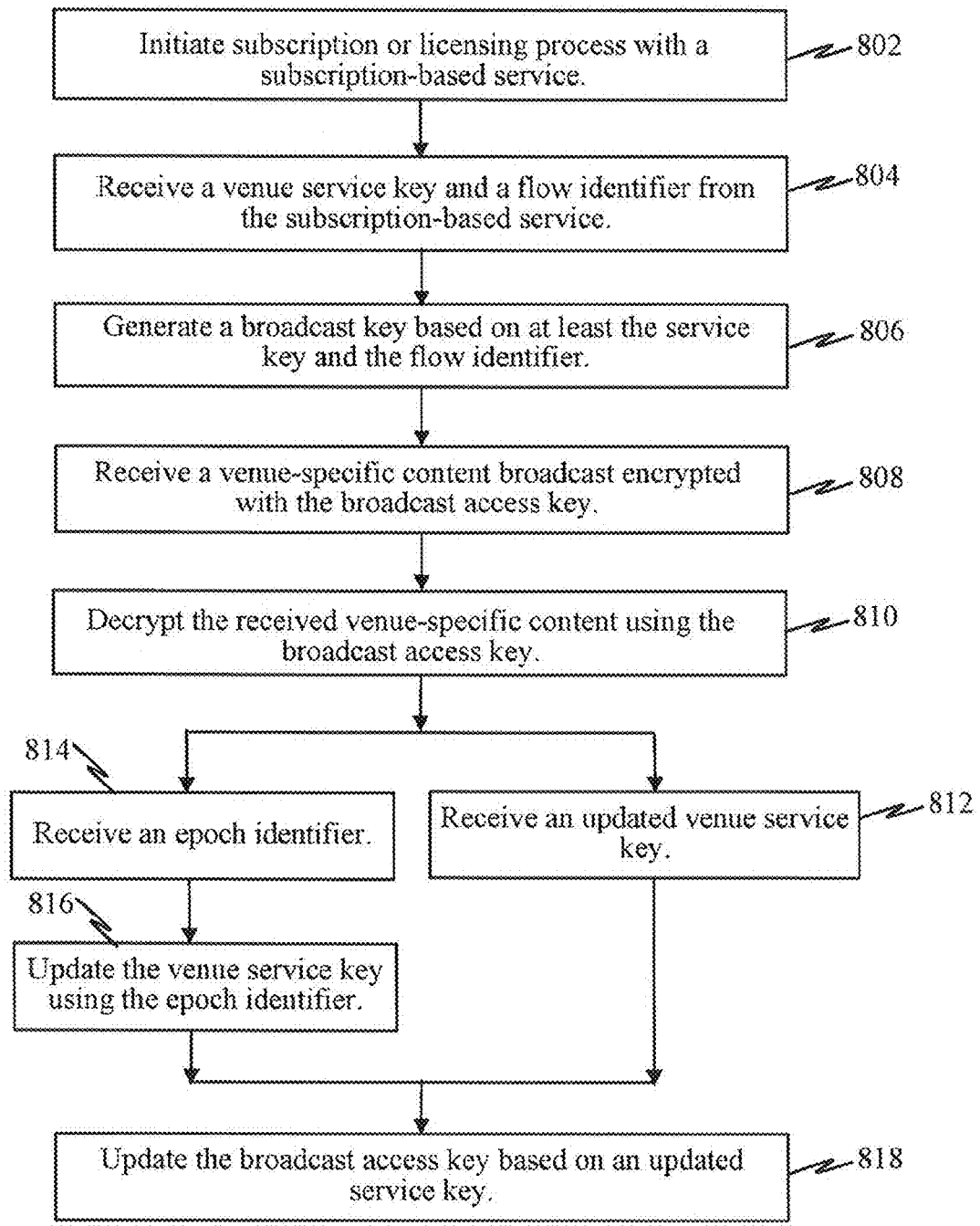
FIG. 8 is a block diagram illustrating a method operational on an access terminal to receive and decrypt venue-specific broadcast/multicast content.

FIG. 8 is a block diagram illustrating a method operational on an access terminal to receive and decrypt venue-specific broadcast/multicast content. The access terminal may send a subscription or licensing request for a subscription-based service 802. In response, the access terminal may receive a venue service key and a flow identifier from the subscription-based service 804. Such request may be sent, and the response may be received, over a wireless network. Additionally, the venue service key may be specific to a particular venue and the flow identifier identifies a specific content broadcast intended for the venue associated with the venue service key. In some instances, the venue may be a location or event in which the access terminal is located. The access terminal then generates a broadcast access key based on at least the venue service key and the flow identifier 806. The access terminal may also receive a venue-specific content broadcast encrypted with the broadcast access key 808. The received venue-specific content is then decrypted using the broadcast access key 810.

In one implementation, the access terminal may receive and updated venue service key 812. Alternatively, the access terminal may receive an epoch identifier 814 that is used to generate an updated venue service key 816. Consequently, the broadcast access key may be updated based on the updated service key 818.

Exemplary Venue Service Gateway

Figure 9:
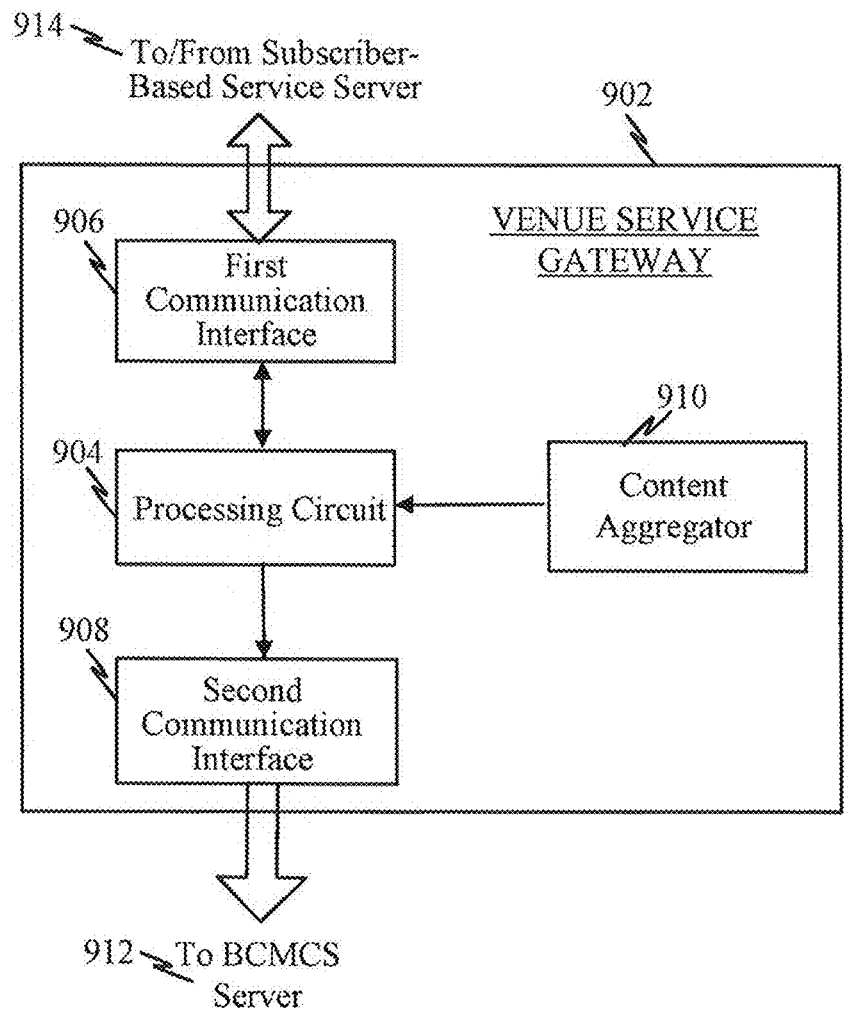
FIG. 9 is a block diagram illustrating an example of a venue service gateway.

FIG. 9 is a block diagram illustrating an example of a venue service gateway. The venue service gateway 902 may be an apparatus, server, or device that includes a processing circuit 904 coupled to a first communication interface 906, a second communication interface 908, and/or a content aggregator 910. In various embodiments, the first communication interface 906 and second communication interface 908 may be distinct communication interface or may be the same interface (e.g., to a network). The processing circuit 904 may be adapted to receive or obtain a venue service key from a subscriber-based service server 914 via the first communication interface 906. The processing circuit 904 then provides this venue service key to a Broadcast/Multicast Services (BCMCS) server 912 via the second communication interface 908, so that the BCMCS server 912 can generate a broadcast access key with which to encrypt venue-specific content. Such venue-specific content is intended for access terminals that are at a particular venue, event, and/or location and have subscribed to a particular subscription package.

According to one implementation, the content aggregator 910 may receive content from one or more sources and the processing circuit 904 forwards some or all of that aggregated content to the BCMCS server 912 for encryption and broadcasting. Some or all of the aggregated content may serve as the venue-specific content to be broadcasted by the BCMCS server 912. Additionally, the subscriber-based service server 914 may also provide the venue service gateway 902 with a new epoch identifier. The venue service gateway 902 may provide this epoch identifier to BCMCS server 912 so that the service key can be updated (which consequently leads to the broadcast access key being updated). Alternatively, the venue service gateway 902 may update the service key using the epoch identifier and provides the updated service key to the BCMCS server 912 to update the broadcast access key.

Figure 10:
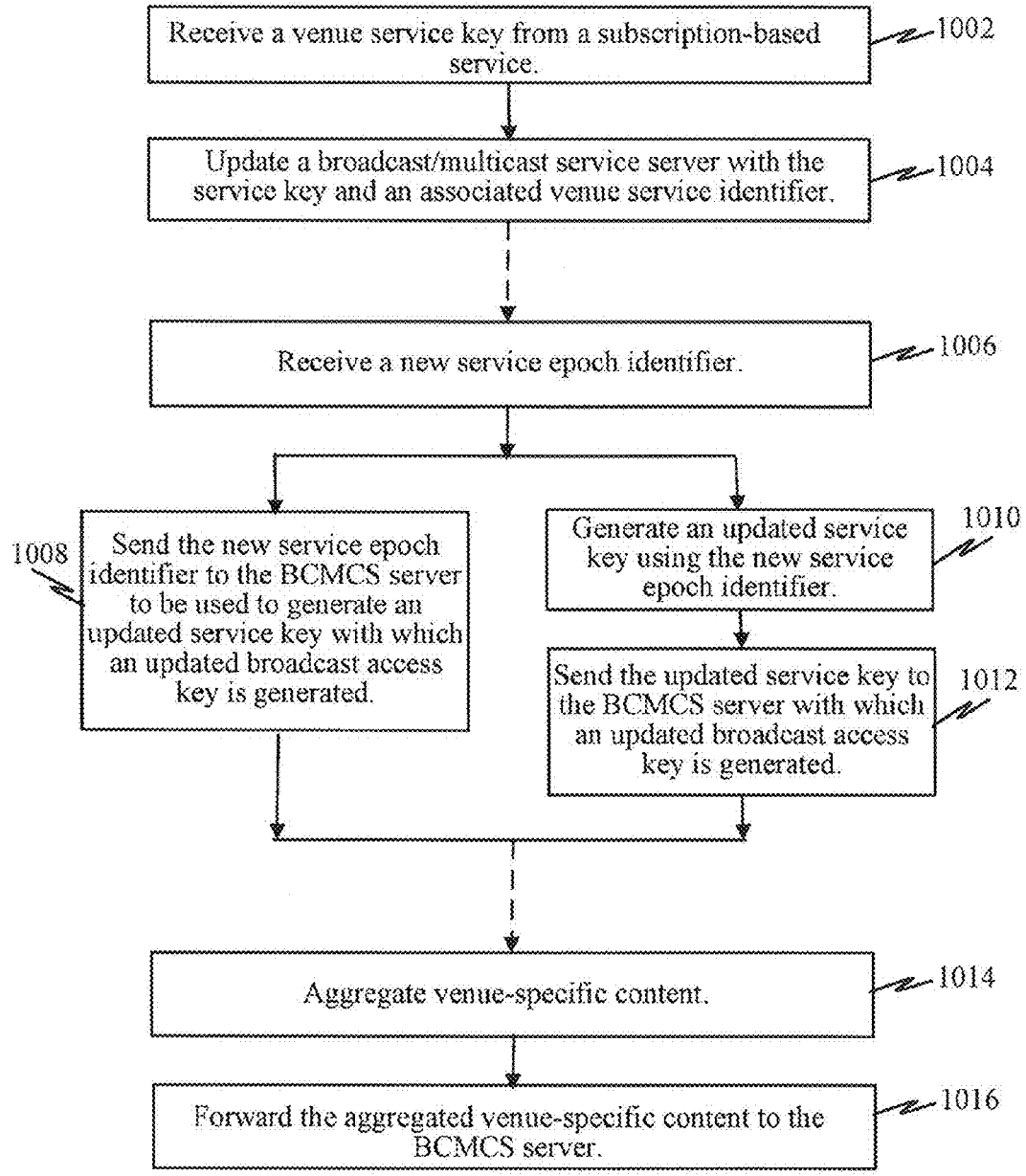
FIG. 10 illustrates a method operational on a venue service gateway to facilitate encryption of content by a BCMCS server using a venue-specific service key.

FIG. 10 illustrates a method operational on a venue service gateway to facilitate encryption of content by a broadcast/multicast service server using a venue-specific service key.

The broadcast/multicast service server may be part of a broadcast/multicast network through which the venue service gateway provides venue-casts services. The venue service gateway may receive the venue service key from a subscription-based service server 1002. The venue service gateway may then update a broadcast multicast service (BCMCS) server with the service key an associated venue service identifier 1004. The BCMCS server then encrypts venue-specific content using a broadcast access key based on the service key for subsequent broadcasting. The encrypted venue-specific content may be broadcasted (multicasted) to access terminals.

The venue service gateway may also receive or obtain a new service epoch identifier 1006. Such service epoch identifier may serve to change the service key from time to time. According to a first option, the venue service gateway may update the BCMCS server with the new service epoch identifier to be used to generate an updated service key with which an updated broadcast access key is generated 1008. According to a second option, the venue service generate an updated service key using the new service epoch identifier 1010 and then sends the updated service key to the BCMCS server with which an updated broadcast access key is generated 1012.

According to an optional feature, the venue service gateway may also aggregate venue-specific content 1014 and forwards the aggregated venue-specific content to the BCMC server 1016. Note that, as used in this example, the BCMCS server may include both a BCMCS controller and a BCMCS content server.

Exemplary Broadcast/Multicast Service Server

Figure 11:
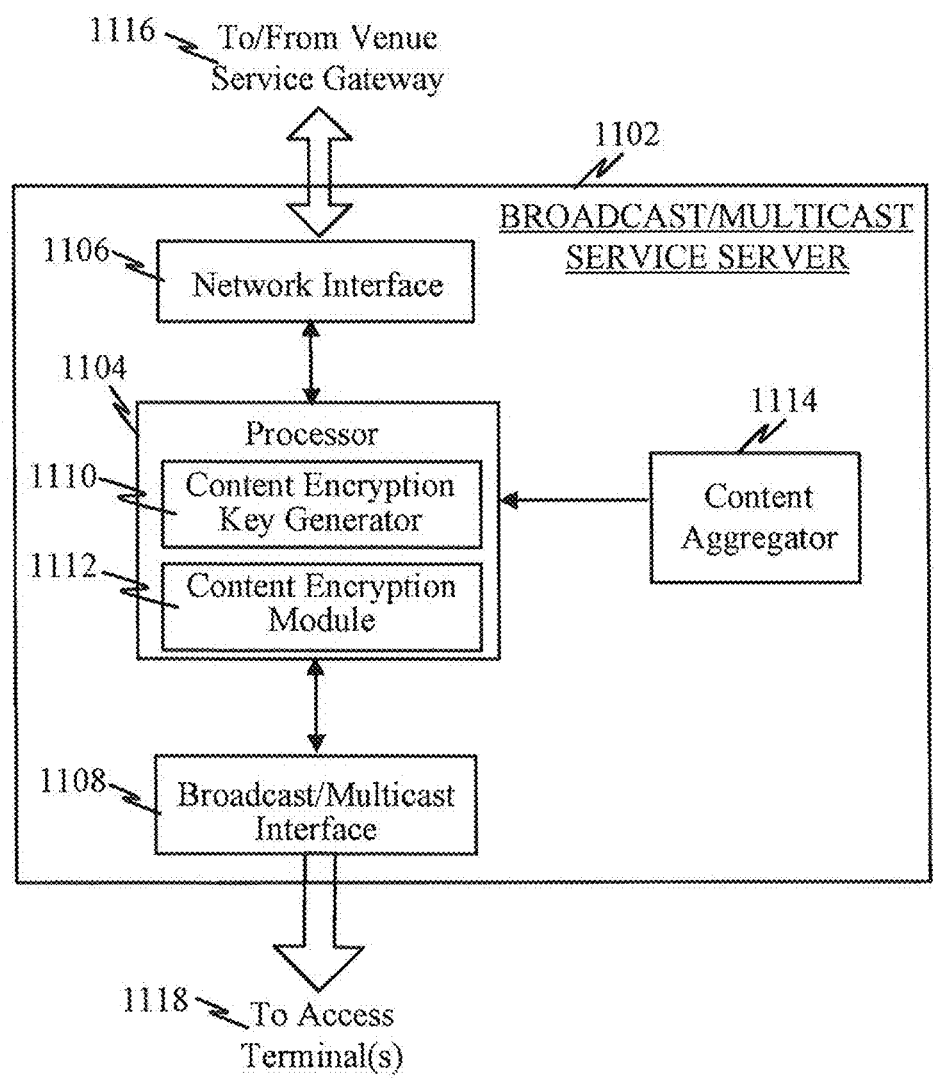
FIG. 11 is a block diagram illustrating an example of a BCMCS system or server.

FIG. 11 is a block diagram illustrating an example of a BCMCS server. In this example, the BCMCS server may perform the functions of both a BCMCS controller and a content server. The BCMCS server 1102 may include a processing circuit 1104 coupled to a network interface 1106, a broadcast/multicast interface 1108, and/or a content aggregator 1114. The processing circuit 1104 may be adapted to receive or obtain a venue service key from a venue service gateway 1116 via the network interface 1106. A content encryption key generator 1110 then generates a broadcast access key using the venue service key. A content encryption module 1112 may then encrypt venue-specific content using the broadcast access key. This encrypted venue-specific content is broadcasted via the broadcast/multicast interface 1108. Such venue-specific content is intended for access terminals 1118 that are at a particular venue, event, and/or location and have subscribed to a particular subscription package. Note that the broadcast/multicast interface may be a wireless interface.

According to an optional implementation, the content aggregator 1114 may receive content from one or more sources. Some or all of the aggregated content may be the venue-specific content that is provided to the processor to be encrypted using the broadcast access key and then broadcasted via the broadcast/multicast interface 1108.

Figure 12:
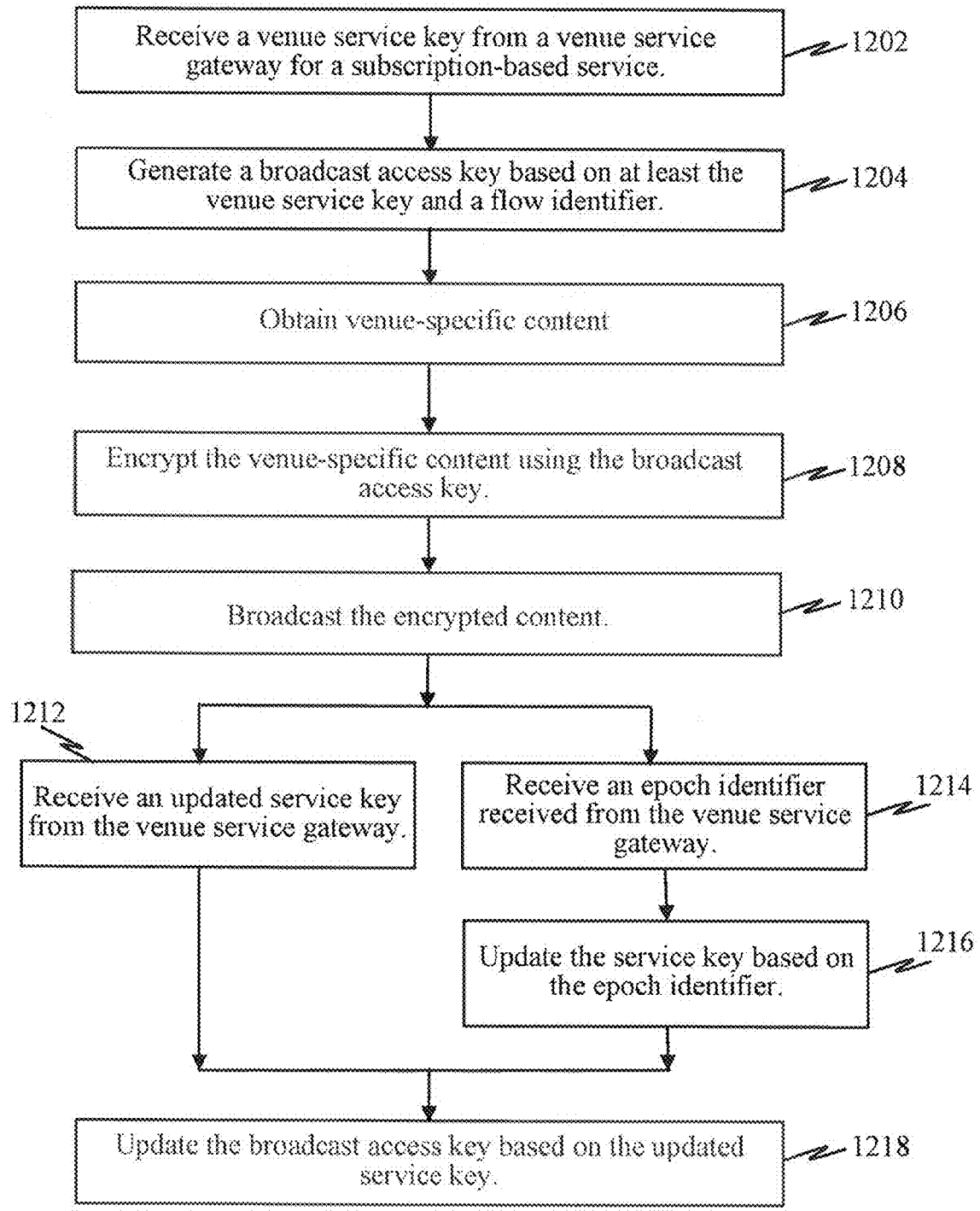
FIG. 12 illustrates a method operational on a broadcast/multicast content server to facilitate encryption of content using a venue-specific service key.

FIG. 12 illustrates a method operational on a broadcast/multicast service server to facilitate encryption of venue-specific content using a venue-specific service key. Such BCMCS server may include both a BCMCS controller and a BCMCS content server. The BCMCS server receives a venue service key from a venue service gateway for a subscription-based service 1202. A broadcast access key may be generated based on at least the service key and a flow identifier 1204. The flow identifier may identify a particular grouping or type of venue-specific content. The BCMCS server may also obtain venue-specific content 1206. Note that the venue-specific content may be specifically associated with a particular venue, event and/or location or associated with a particular subscription package for the subscription-based service. The venue-specific content is encrypted using the broadcast access key 1208. The encrypted content is then broadcasted 1210.

According to one option, the BCMCS server may receive an updated service key from the venue service gateway 1212. Alternatively, the BCMCS server may receive an epoch identifier from the venue service gateway 1214 and updates the service key based on the epoch identifier 1216. The broadcast access key may be updated by using the updated service key 1218.

The BCMCS server may also receive a flow identifier from the venue service gateway and uses the flow identifier to generate the broadcast access key. The broadcast access key may also be updated by using a venue identifier received from the venue service gateway and uses the venue identifier to generate the broadcast access key.

Note that an access terminal receives all information, such as flow identifier, venue service key, etc., (used by the BCMCS server to generate its broadcast access key) during a subscription/licensing process or beforehand.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium or machine-readable medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

One or more of the components, steps, and/or functions illustrated in FIGS. 1, 2, 3, 4, 5, 6, 7, 8, 9, 10, 11, and/or 12 may be rearranged and/or combined into a single component, step, or function or embodied in several components, steps, or functions without affecting the operation of the pseudo-random number generation. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on an access terminal for receiving venue-specific broadcast content, comprising:
   initiating a subscription or licensing process with a subscription-based service;
   receiving a venue service key and a flow identifier from the subscription-based service, wherein the venue service key is specific to a particular venue;
   generating a broadcast access key based on at least the venue service key and the flow identifier;
   updating the venue service key based on an identifier;
   updating the broadcast access key based on the updated venue service key;
   receiving a venue-specific content broadcast encrypted with the broadcast access key; and
   decrypting the received venue-specific content using the broadcast access key.

2. The method of claim 1, wherein the venue-specific content is received from an Evolution Data-Only (EVDO) broadcast/multicast server (BCMCS).

3. The method of claim 1, wherein the venue service key is specific to a particular subscription package for the subscription-based service.

4. An access terminal, comprising:
   a first wireless interface;
   a processing circuit coupled to the first wireless interface, the processing circuit adapted to
   initiate a subscription or licensing process with a subscription-based service;
   receive a venue service key and a flow identifier from the subscription-based service, wherein the venue service key is specific to a particular venue;
   generate a broadcast access key based on at least the venue service key and the flow identifier;
   update the venue service key based on an identifier;
   update the broadcast access key based on the updated venue service key;
   receive a venue-specific content broadcast encrypted with the broadcast access key; and
   decrypt the received venue-specific content using the broadcast access key.

5. The access terminal of claim 4, further comprising:
   a second wireless interface coupled to the processing circuit, wherein the subscription or licensing process is performed over the first wireless interface and the venue-specific content broadcast is received over the second wireless interface.

6. The access terminal of claim 4, wherein the venue service key is specific to a particular subscription package for the subscription-based service.

7. An access terminal, comprising:
   means for initiating a subscription or licensing process with a subscription-based service;
   means for receiving a venue service key and a flow identifier from the subscription-based service, wherein the venue service key is specific to a particular venue;
   means for generating a broadcast access key based on at least the venue service key and the flow identifier;
   means for updating the venue service key based on an identifier;
   means for updating the broadcast access key based on the updated venue service key;
   means for receiving a venue-specific content broadcast encrypted with the broadcast access key; and
   means for decrypting the received venue-specific content using the broadcast access key.

8. A processor comprising:
   a processing circuit to:
   initiate a subscription process with a subscription-based service;
   receive a venue service key and a flow identifier from the subscription-based service, wherein the venue service key is specific to a particular venue;
   generate a broadcast access key based on at least the venue service key and the flow identifier;
   update the venue service key based on an identifier;
   update the broadcast access key based on the updated venue service key;
   receive broadcast venue-specific content encrypted by the broadcast access key; and
   decrypt the received venue-specific content using the broadcast access key.

9. A non-transitory machine-readable medium comprising instructions operational in an access terminal for receiving venue-specific broadcast content, which when executed by one or more processors causes the processors to:

initiate a subscription or licensing process with a subscription-based service;

receive a venue service key and a flow identifier from the subscription-based service, wherein the venue service key is specific to a particular venue;

generate a broadcast access key based on at least the venue service key and the flow identifier;

update the venue service key based on an identifier;

update the broadcast access key based on the updated venue service key;

receive a venue-specific content broadcast encrypted with the broadcast access key; and decrypt the received venue-specific content using the broadcast access key.

10. A method operational on a venue service gateway for securely delivering a venue-specific content broadcast to access terminals, comprising:

receiving a venue service key from a subscription-based service, wherein the venue service key is associated with a subscription package and a particular venue; and updating the venue service key based on an identifier; and updating a broadcast/multicast services server with the venue service key, wherein the broadcast/multicast services server encrypts venue-specific content using a broadcast access key generated based on the venue service key.

11. The method of claim 10, further comprising:

sending a flow identifier to the broadcast/multicast services server which is also used to generate the broadcast access key.

12. The method of claim 10, further comprising:

sending a venue identifier to the broadcast/multicast services server which is also used to generate the broadcast access key.

13. The method of claim 10, further comprising:

aggregating venue-specific content; and forwarding the aggregated venue-specific content to the broadcast/multicast services server.

14. A venue service gateway, comprising:

a first communication interface for communicating with a subscriber-based service;

a second communication interface for communicating with a broadcast/multicast services server;

a processing circuit coupled to the first and second communication interfaces, the processing circuit adapted to receive a venue service key from the subscription-based service via the first communication interface, wherein the venue service key is associated with a subscription package and a particular venue;

update the venue service key based on an identifier; and update the broadcast/multicast services server via the second communication interface with the venue service key, wherein the broadcast/multicast services server encrypts venue-specific content using a broadcast access key generated based on the venue service key.

15. The venue service gateway of claim 14, wherein the processing circuit is further adapted to:

send a flow identifier to the broadcast/multicast services server which is also used to generate the broadcast access key.

16. The venue service gateway of claim 14, wherein the processing circuit is further adapted to send a venue identifier to the broadcast/multicast services server which is also used to generate the broadcast access key.

17. The venue service gateway of claim 14, further comprising:

a content aggregator adapted to aggregate venue-specific content; and forward the aggregated venue-specific content to the broadcast/multicast services server.

18. A venue service gateway, comprising:

means for receiving a venue service key from a subscription-based service, wherein the venue service key is associated with a subscription package and a particular venue;

means for updating the venue service key based on an identifier; and means for updating the broadcast/multicast services server with the updated venue service key.

19. The venue service gateway of claim 18, further comprising:

means for receiving a new service epoch identifier used to update the venue service key; and means for updating the broadcast/multicast services server with the new service epoch identifier which is used to update the venue service key and, consequently, the broadcast access key.

20. A processor comprising:

a processing circuit to:

receive a venue service key from a subscription-based service, wherein the venue service key is associated with a subscription package and a particular venue;

update the venue service key based on an identifier; and update a broadcast/multicast services server with the venue service key, wherein the broadcast/multicast services server encrypts venue-specific content using a broadcast access key generated based on the venue service key.

21. A non-transitory machine-readable medium comprising instructions operational in a venue service gateway, which when executed by one or more processors causes the processors to:

receive a venue service key from a subscription-based service, wherein the venue service key is associated with a subscription package and a particular venue;

update the venue service key based on an identifier; and update a broadcast/multicast services server with the venue service key, wherein the broadcast/multicast services server encrypts venue-specific content using a broadcast access key generated based on the venue service key.

22. A method operational on a broadcast/multicast services server for facilitating secure delivery of a venue-specific content broadcast to access terminals, comprising:

receiving a venue service key from a venue service gateway for a subscription-based service, wherein the venue service key is associated with a subscription package and a particular venue;

generating a broadcast access key based on at least the venue service key and a flow identifier;

receiving an updated venue service key based on an identifier;

updating the broadcast access key based on the updated venue service key;

encrypting venue-specific content based on the broadcast access key; and broadcasting the encrypted venue-specific content.

23. The method of claim 22, further comprising:

receiving an epoch identifier from the venue service gateway;

updating the venue service key using the epoch identifier; and updating the broadcast access key using the updated venue service key.

24. The method of claim 22, further comprising:
receiving the flow identifier from the venue service gateway.

25. The method of claim 22, further comprising:
receiving a venue identifier from the venue service gateway; and
generating the broadcast access key using the venue identifier.

26. The method of claim 22, further comprising:
aggregating the venue-specific content for broadcasting.

27. A broadcast/multicast services server adapted for facilitating secure delivery of venue-specific broadcast content to access terminals, comprising:
a network interface for communicating with a venue service gateway;
a broadcast interface for broadcasting to access terminals; and
the processing circuit is adapted to:
receive a venue service key from the venue service gateway for a subscription-based service, wherein the venue service key is associated with a subscription package and a particular venue;
receive an updated venue service key based on an identifier from the venue service gateway;
generate a broadcast access key based on at least the venue service key and a flow identifier;
encrypt venue-specific content based on the broadcast access key; and
broadcast the encrypted venue-specific content via the broadcast interface.

28. The server of claim 27, wherein the processing circuit is adapted to:
receive an epoch identifier from the venue service gateway;
update the venue service key using the epoch identifier; and
update the broadcast access key using the updated venue service key.

29. The server of claim 27, wherein the processing circuit is adapted to:
receive the flow identifier from the venue service gateway.

30. The server of claim 27, wherein the processing circuit is adapted to:
receive a venue identifier from the venue service gateway; and
generate the broadcast access key using the venue identifier.

31. The server of claim 27, further comprising:
a content aggregator adapted to aggregate the venue-specific content.

32. A broadcast/multicast services server, comprising:
means for receiving a venue service key from a venue service gateway for a subscription-based service, wherein the venue service key is associated with a subscription package and a particular venue;
means for receiving an updated venue service key based on an identifier from the venue service gateway;
means for generating a broadcast access key based on the venue service key and a flow identifier;
means for encrypting venue-specific content based on the broadcast access key; and
means for broadcasting the encrypted venue-specific content.

33. A processor comprising:
a processing circuit to:
receive a venue service key from a venue service gateway for a subscription-based service, wherein the venue service key is associated with a subscription package and a particular venue;
update the venue service key based on an identifier;
generate a broadcast access key based on the venue service key and a flow identifier;
encrypt venue-specific content based on the broadcast access key; and
broadcast the encrypted venue-specific content.

34. A non-transitory machine-readable medium comprising instructions operational in a broadcast/multicast services server, which when executed by one or more processors causes the processors to:
receive a venue service key from a venue service gateway for a subscription-based service, wherein the venue service key is associated with a subscription package and a particular venue;
update the venue service key based on an identifier;
generate a broadcast access key based on the venue service key and a flow identifier;
encrypt venue-specific content based on the broadcast access key; and
broadcast the encrypted venue-specific content.

* * * * *